(12) United States Patent
Oh et al.

(10) Patent No.: US 9,203,077 B2
(45) Date of Patent: Dec. 1, 2015

(54) POSITIVE ELECTRODE ACTIVE MATERIAL FOR A LITHIUM SECONDARY BATTERY, METHOD FOR PRODUCING SAME, AND LITHIUM SECONDARY BATTERY COMPRISING SAME

(75) Inventors: Sung Woo Oh, Daejeon (KR); Hee Young Sun, Gyeonggi-do (KR); Yu Rim Do, Daejeon (KR); Hyung Bok Lee, Seoul (KR)

(73) Assignee: SK INNOVATION CO., LTD. (KR)

( * ) Notice: Subject to any disclaimer, the term of this patent is extended or adjusted under 35 U.S.C. 154(b) by 85 days.

(21) Appl. No.: 13/821,758

(22) PCT Filed: Sep. 9, 2011

(86) PCT No.: PCT/KR2011/006740
§ 371 (c)(1),
(2), (4) Date: May 28, 2013

(87) PCT Pub. No.: WO2012/033389
PCT Pub. Date: Mar. 15, 2012

(65) Prior Publication Data
US 2013/0244112 A1    Sep. 19, 2013

(30) Foreign Application Priority Data

Sep. 9, 2010 (KR) .................. 10-2010-0088236
Sep. 9, 2011 (KR) .................. 10-2011-0091771

(51) Int. Cl.
| | | |
|---|---|---|
| H01M 4/131 | (2010.01) | |
| H01M 4/505 | (2010.01) | |
| C01B 25/45 | (2006.01) | |
| C01B 31/02 | (2006.01) | |
| H01M 4/36 | (2006.01) | |
| H01M 4/58 | (2010.01) | |
| H01M 4/62 | (2006.01) | |
| H01M 4/1397 | (2010.01) | |
| H01M 10/052 | (2010.01) | |

(52) U.S. Cl.
CPC ............... *H01M 4/131* (2013.01); *C01B 25/45* (2013.01); *C01B 31/02* (2013.01); *H01M 4/366* (2013.01); *H01M 4/505* (2013.01); *H01M 4/5825* (2013.01); *H01M 4/625* (2013.01); *C01P 2004/84* (2013.01); *H01M 4/1397* (2013.01); *H01M 10/052* (2013.01)

(58) Field of Classification Search
CPC ....................................................... H01M 4/505
USPC .......................... 429/218.1, 221, 224, 231.95
See application file for complete search history.

(56) References Cited

U.S. PATENT DOCUMENTS

| | | |
|---|---|---|
| 8,357,468 B2 | 1/2013 | Exnar et al. |
| 2006/0165041 A1 | 7/2006 | Song et al. |
| 2008/0039013 A1 | 2/2008 | Chang et al. |

FOREIGN PATENT DOCUMENTS

| | | |
|---|---|---|
| CN | 101320809 | * 12/2008 |
| CN | 101803075 | 8/2010 |
| CN | 102142557 | 8/2011 |
| JP | 2002015735 | 1/2002 |
| JP | 2004259470 | 9/2004 |
| JP | 2007035358 | 2/2007 |
| JP | 2010287450 | 12/2010 |
| JP | 2011076820 | 4/2011 |
| JP | 2011238594 | 11/2011 |
| JP | 2013525975 | 6/2013 |
| KR | 1020080047536 | 5/2008 |
| KR | 1020100018030 | 2/2010 |
| KR | 1020110036447 | 4/2011 |
| WO | 2011132931 | 10/2011 |

OTHER PUBLICATIONS

Matha et al., LiMn0.8Fe0.2PO4 : An Advanced Cathode Material for Rechargeable Lithium Batteries, Angew. Chem. Int. Ed. 2009, 48, 8559-8563.*
JP 2007035358—Translation.*
KR 1020110036447—Translation.*
International Search Report—PCT/KR2011/006470 dated Apr. 12, 2012.

* cited by examiner

*Primary Examiner* — Ladan Mohaddes
(74) *Attorney, Agent, or Firm* — Cantor Colburn LLP

(57) ABSTRACT

The present invention relates to a positive electrode active material for a lithium secondary battery having improved thermal stability, a method for producing the positive electrode active material, and a lithium secondary battery containing the same. The positive electrode active material may be represented by the following Chemical Formula 1 and contain particles having an average particle size of 200 nm to 1 μm, wherein the surfaces of the particles are coated with a uniform carbon coating layer.

$Li_aMn_{1-x}M_xPO_4$     [Chemical Formula 1]

(Where, M is any one or a mixture of two or more selected from Mg, Fe, Co, Cr, Ti, Ni, Cu, Zn, Zr, Nb, and Mo, and a and x satisfy the following Equations: $0.9 \leq a \leq 1.1$ and $0 \leq x < 0.5$.).

9 Claims, No Drawings

POSITIVE ELECTRODE ACTIVE MATERIAL FOR A LITHIUM SECONDARY BATTERY, METHOD FOR PRODUCING SAME, AND LITHIUM SECONDARY BATTERY COMPRISING SAME

TECHNICAL FIELD

The present invention relates to a positive electrode active material for a lithium secondary battery, a method for producing the same, and a lithium secondary battery containing the same, and more particularly, to a positive electrode active material for a lithium secondary battery having improved electro-chemical properties, a method for producing the same, and a lithium secondary battery containing the same.

BACKGROUND ART

As a positive electrode active material for a lithium secondary battery, $LiCoO_2$, $LiMn_2O_4$, $LiNi_xCo_yMn_zO_2$, and the like, have been mainly used. However, in accordance with the development of a middle and large-sized battery (hybrid electric vehicle (HEV), plug-in hybrid electric vehicle (PHEV), electric vehicle (EV)), a problem such as safety of the battery has been in the spotlight. In the case of the positive electrode active materials currently commercialized, since the positive electrode active material is expensive or there is a problem in terms of safety, or the like, research into a new positive electrode active material has been conducted.

Among various candidate materials, research into an olivine type $LiMPO_4$ (M=Fe, Mn, Co, and Ni) positive electrode active material that is economical and safe has been actively conducted. Particularly, $LiFePO_4$ has been currently developed as an energy source of a hybrid vehicle and an electric vehicle by allowing $LiFePO_4$ to have a particle size of nano scale and coating $LiFePO_4$ with carbon in order to solve a problem of low conductivity. (See Japanese Patent Laid-Open Nos. 2002-015735 and 2004-259470)

However, in the case of $LiFePO_4$, since an average operation voltage is about 3.5V, there is a problem that energy density is lower than those of other positive electrode active materials. The energy density is low, which means that the number of cells of a battery in a limited volume may be insufficient as compared with the required number. That is, in order to have the same capacity, the volume should be increased. In order to overcome this problem, research into $Mn^{3+/4+}$ (4.1V) having a discharge voltage higher than $Fe^{2+/3+}$ (3.5 V) has been conducted.

DISCLOSURE

Technical Problem

An object of the present invention is to provide a positive electrode active material for a lithium secondary battery having excellent electro-chemical properties by having a low carbon content, and a method for producing the same.

Another object of the present invention is to provide a lithium secondary battery containing the positive electrode active material.

The technical objects of the present invention are not limited to the above-mentioned technical objects, and other technical objects that are not mentioned will be clearly understood by those skilled in the art through the following descriptions.

Technical Solution

In one general aspect, a positive electrode active material for a lithium secondary battery includes particles represented by the following Chemical Formula 1 and having an average particle size of 200 nm to 1 μm, wherein surfaces of the particles are coated with a carbon coating layer.

$Li_aMn_{1-x}M_xPO_4$  [Chemical Formula 1]

(where, M is any one or a mixture of at least two selected from Mg, Fe, Co, Cr, Ti, Ni, Cu, Zn, Zr, Nb, and Mo, and a and x satisfy the following Equations: $0.9 \leq a \leq 1.1$ and $0 \leq x < 0.5$.)

In another general aspect, a positive electrode active material for a lithium secondary battery includes particles represented by the following Chemical Formula 2 and having an average particle size of 200 nm to 1 μm, wherein surfaces of the particles are coated with a carbon coating layer.

$Li_aMnPO_4$  [Chemical Formula 2]

(Where, a satisfies the following Equation: $0.9 \leq a \leq 1.1$.)

In another general aspect, a positive electrode active material for a lithium secondary battery includes particles represented by the following Chemical Formula 3 and having an average particle size of 200 nm to 1 μm, wherein surfaces of the particles are coated with a carbon coating layer.

$Li_aMn_{1-x}M_xPO_4$  [Chemical Formula 3]

(Where, M is Fe, and a and x satisfy the following Equations $0.9 \leq a \leq 1.1$ and $0.1 \leq x \leq 0.2$.)

The carbon coating layer may have a thickness of 5 to 10 nm.

In another general aspect, a method for producing a positive electrode active material for a lithium secondary battery, the method includes:

adding a lithium raw material, a manganese raw material, and a phosphorus raw material to alcohol to prepare a metal mixed solution;

milling the metal mixed solution to atomize the metal mixed solution;

adding a carbon raw material to the atomized solution to uniformly mix them; and performing heat-treatment on the mixture under an inert atmosphere.

In addition, at the time of preparing the metal mixed solution, the metal raw material may be further contained, wherein the metal raw material is any one or a mixture of two or more selected from Mg, Fe, Co, Cr, Ti, Ni Cu, Zn, Zr, Nb, and Mo.

In another general aspect, a lithium secondary battery includes: a positive electrode containing the positive electrode active material described above; a negative electrode containing a negative electrode active material; and a non-aqueous electrolyte solution.

Advantageous Effects

According to the present invention, the positive electrode active material may be simply synthesized and configured of nano particles having the uniform carbon coating layer, such that the positive electrode active material for a lithium secondary battery capable of having high rate capacity improved in accordance with the improvement of electrical conductivity may be obtained.

BEST MODE

Hereinafter, embodiments of the present invention will be described in detail. However, the embodiments are described for illustrative purpose, but the present invention is not limited thereto.

A positive electrode active material according to an embodiment of the present invention is represented by the following Chemical Formula 1, has an average particle size of 200 nm to 1 μm, and includes a secondary particle. In this case, the particle may include a spherical particle, an oval particle, and a plate type particle, but is not limited thereto. In addition, a uniform carbon coating layer is formed on a surface of the particle.

$$Li_aMn_{1-x}M_xPO_4 \quad \text{[Chemical Formula 1]}$$

(Where, M is any one or a mixture of two or more selected from Mg, Fe, Co, Cr, Ti, Ni, Cu, Zn, Zr, Nb, and Mo, and a and x satisfy the following Equations: $0.9 \leq a \leq 1.1$ and $0 \leq x < 0.5$.)

More specifically, the positive electrode active material according to the present invention is represented by the following Chemical Formula 2 or 3, has the average particle size of 200 nm to 1 μm, and includes the secondary particle. In this case, the particle may include a spherical particle, an oval particle, and a plate type particle, but is not limited thereto. In addition, a uniform carbon coating layer is formed on a surface of the particle. In this case, the carbon coating layer is coated at a thickness of 5 to 10 nm.

$$Li_aMnPO_4 \quad \text{[Chemical Formula 2]}$$

(Where, a satisfies the following Equation: $0.9 \leq a \leq 1.1$.)

$$Li_aMn_{1-x}M_xPO_4 \quad \text{[Chemical Formula 3]}$$

(Where, M is Fe, and a and x satisfy the following Equations $0.9 \leq a \leq 1.1$ and $0.1 \leq x \leq 0.2$.)

In the positive electrode active material, preferably, the average particle size of the particle is 200 nm to 1 μm, and in the case in which the average particle size is less than 200 nm, since the particle is excessively fine, a large amount of binders are consumed at the time of manufacturing an electrode. In addition, tap density may become low. In the case in which the average particle size is more than 1 μm, it may be difficult to uniformly form the carbon coating layer, and in order to implement the uniform carbon coating layer, a large amount of carbon source is required.

The carbon coating layer is made of amorphous carbon, for example, soft carbon (low-temperature fired carbon), pitch carbide, mesophase pitch carbide, fired cokes, sucrose, glucose, polyvinyl pyrrolidone (PVP), polyethylene glycol (PEG), polyvinyl alcohol (PVA), nano carbon fiber, or the like.

A thickness of the carbon coating layer may be 5 to 10 nm. In the case in which the thickness of the carbon coating layer is in this range, the carbon coating layer may be uniformly coated on surfaces of the particles and separation and insertion of lithium ions may be appropriately performed, such that electro-chemical properties may be improved, and since the carbon layer is presented between an electrolyte solution and the particle, a side reaction by HF generated by decomposition of the electrolyte at the time of measurement at a high temperature may be suppressed. In the case in which the thickness of the carbon coating layer is less than 5 nm, since the carbon coating layer is not uniformly formed on the particle, the side reaction by the electrolyte solution may be generated at portions at which the carbon coating layer is not formed, and Mn dissolution may be increased, such that the electro-chemical properties may be deteriorated. Further, in the case in which the thickness of the carbon coating layer is more than 10 nm, the coating layer is formed to be excessively thick, a diffusion rate of Li$^+$ ion may be decreased.

In Chemical Formula 2, oxygen sites in a crystal structure become deficient due to an oxygen deficient structure. In this case, O—O binding energy is decreased, such that a path through which the separation and insertion of the Li$^+$ ion may be easily performed may be provided. In the case of Chemical Formula 2, since the Li$^+$ ion may more easily move as compared with in Chemical Formula 1, a content of the carbon source used in order to improve electrical conductivity is decreased, such that density of an electrode material is increased, which is advantageous for manufacturing an electrode.

In the positive electrode active material according to the embodiment of the present invention, which is a material having a nano size and including the uniform carbon coating layer formed thereon, since high rate capability is improved, and the separation and insertion of the Li$^+$ ion may be easily performed, high capacity may be obtained.

A method for producing a positive electrode active material according to an embodiment of the present invention, the method includes:

adding a lithium raw material, a manganese raw material, and a phosphorus raw material to alcohol to prepare a metal mixed solution;

milling the metal mixed solution to atomize the metal mixed solution;

adding a carbon raw material to the atomized solution to uniformly mix them; and performing heat-treatment on the mixture under an inert atmosphere.

More specifically, first, a mixed dispersion solution is prepared by adding the lithium raw material, the manganese raw material, and the phosphorus raw material to alcohol. In this case, a mixing ratio of the lithium raw material, the manganese raw material, and the phosphorus raw material are adjusted so that a molar ratio of Li:Mn:P is 0.95:1:1 to 1.1:1:1.

At the time of preparing the metal mixed solution, a content of alcohol may be in a range of 1:1 to 10 by weight ratio based on the total weight of the lithium raw material, the manganese raw material, and the phosphorus raw material, or in a range of 50 to 200 mole % based on the manganese raw material.

In addition, at the time of preparing the metal mixed solution, a metal raw material may be further contained, wherein the metal raw material is any one or a mixture of two or more selected from Mg, Fe, Co, Cr, Ti, Ni, Cu, Zn, Zr, Nb, and Mo. Since M is present while partially substituting Mn in a final product, a content of the metal (hereinafter, referred to as M) containing raw material may be preferably 0 mole % or more and smaller than 50 mole % when the total amount of the containing raw material and the M containing raw material is defined as 100 mole %. More preferably, the content of the M containing raw material may be 10 to 20 mole %. As the M containing raw material, M containing sulfate, M containing hydroxide, M containing nitrate, M containing acetate or a mixture thereof may be used. More preferably, as the metal, Fe may be used, and as a Fe containing raw material, Fe$_2$O$_3$, or the like, may be used.

As the lithium raw material, lithium fluoride, lithium carbonate, lithium hydroxide, lithium nitrate, lithium acetate, or a mixture thereof may be used.

As the manganese raw material, manganese chloride, manganese oxide, manganese sulfate, manganese hydroxide, manganese nitrate, manganese acetate, or a mixture thereof may be used.

Further, as the phosphorus raw material, phosphoric acid, metaphosphoric acid, diphosphoric acid, orthophosphoric acid, monoammonium phosphate, phosphorus pentoxide, or a mixture thereof may be used.

Then, the mixed dispersion solution is milled to thereby be atomized. In this case, the milling may be performed using a Spex-mill. A milling time may be 30 to 120 minutes. When an milling time is less than 30 minutes, the mixed dispersion solution may not be sufficiently and uniformly mixed, and the particle may not be uniformly atomized, such that it may be difficult to obtain the uniform carbon coating layer. When the milling time is more than 120 minutes, the mixed dispersion solution may be uniformly mixed, but the atomized particles may be again granulated, such that the particle size may become larger than the desired size. In this case, it may be difficult to obtain the uniform carbon coating layer using a small amount of carbon raw material.

After atomization, the carbon raw material is added thereto and then mixed using the Spex-mill. As the carbon raw material, any one selected from soft carbon (low-temperature fired carbon), pitch carbide, mesophase pitch carbide, fired cokes, citric acid, ascorbic acid, polyvinyl alcohol, urea, sucrose, glucose, and cellulose, or a mixture thereof may be used. After the carbon raw material is added, the atomization process is performed, such that the raw materials are uniformly mixed each other. Then, the heat-treatment is performed under the inert atmosphere, thereby making it possible to obtain the uniform carbon coating layer.

A usage amount of the carbon raw material may be 5 to 20 weigh % based on the weight of the manganese raw material. In the case in which the content of the carbon raw material is less than 5 weight %, the content of the carbon is excessively low, such that it may be difficult to uniformly coat circumferences of the particles, and the side reaction with the electrolyte solution may be generated on the surfaces of some of the un-coated particles, thereby significantly decreasing life characteristics at a high temperature and high rate capability. Further, in the case in which the content is more than 20 weight %, the content of the carbon is excessively high, such that the carbon coating may be uniformly performed on some of the particles, but the carbon coating may be performed to be locally thick on most of the particles, which has a negative influence on the diffusion rate of the lithium, thereby deteriorating the electro-chemical properties. It is preferable that the carbon coating layer has a thickness of 5 to 10 nm after heat-treatment, and the coating thickness may be satisfied by using the carbon raw material in the above-mentioned content range.

The heat-treatment under the inert atmosphere (($N_2$, Ar, or $H_2$/Ar=95:5 or 90:10) may be performed at 500 to 800° C. for 3 to 10 hours. In the case in which a temperature at the time of the heat-treatment is in the above-mentioned range, uniform particles having a size of 200 nm to 1 μm, may be prepared. The prepared primary particles may have crystallinity and be represented by Chemical Formula 1.

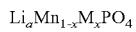    [Chemical Formula 1]

(Where, M is any one or a mixture of two or more selected from Mg, Fe, Co, Cr, Ti, Ni, Cu, Zn, Zr, Nb, and Mo, and a and x satisfy the following Equations: $0.9 \leq a \leq 1.1$ and $0 \leq x < 0.5$.)

The method for producing a positive electrode active material according to the embodiment of the present invention as described above, which is a method for producing a mixed dispersion solution, may be easy as compared with a hydro-thermal synthesis method, a precipitation method, a sol-gel method, a co-precipitation method, and the like. Further, in this method, nano-particles of $Li_aMn_{1-x}M_xPO_4$ (M is any one or a mixture of two or more selected from Mg, Fe, Co, Cr, Ti, Ni, Cu, Zn, Zr, Nb, and Mo, and a and x satisfy the following Equations: $0.9 \leq a \leq 1.1$ and $0 \leq x < 0.5$) and $Li_aMnPO_4$ ($0.95 \leq a \leq 1.1$) materials may be synthesized, and the lithium raw material, the manganese raw material, and the phosphorus raw material may be uniformly mixed at a time, thereby making it possible to mass-produce the positive electrode active material.

The positive electrode active material according to the embodiment of the present invention may be usefully used in a positive electrode of a lithium secondary battery. The lithium secondary battery may include the positive electrode, a negative electrode containing a negative electrode active material, and a non-aqueous electrolyte.

The positive electrode may be prepared by mixing the positive electrode active material according to the embodiment of the present invention, a conductive material, a binding material, and a solvent to prepare a positive electrode active material composition, and then directly coating and drying the prepared positive electrode active material composition onto an aluminum current collector. Alternatively, the positive electrode may be prepared by casting the positive electrode active material composition on a separate supporter and laminating a film separated from the supporter on the aluminum current collector.

In this case, as the conductive material, carbon black, graphite, and metal powder may be used, and as the binding material, a vinylidene fluoride/hexafluoropropylene copolymer, polyvinylidene fluoride, polyacrylonitrile, polymethylmethacrylate, polytetrafluoroethylene, and a mixture thereof may be used. In addition, as the solvent, N-methylpyrrolidone, acetone, tetrahydrofuran, decane, and the like, may be used. In this case, the positive electrode active material, the conductive material, the binding material, and the solvent may be used at the content level at which they are generally used in the lithium secondary battery.

The negative electrode may be prepared by mixing the negative electrode active material, a binding material, and solvent to prepare a negative electrode active material composition and then directly coating the negative electrode active material composition onto a copper current collector, or casting the negative electrode active material composition on a separate supporter and laminating the negative electrode active material film separated from the support on the copper current collector, similarly to the positive electrode. In this case, the negative electrode active material composition may further contain a conductive material, as needed.

As the negative electrode active material, a material capable of performing intercalation/de-intercalation of lithium may be used. For example, a lithium metal, a lithium alloy, lithium titanate, silicon, a tin alloy, cokes, artificial graphite, natural graphite, an organic polymer compound, a combustible material, carbon fiber, or the like, may be used. Further, the conductive material, the binding material, and the solvent may be the same as those in the case of the above-mentioned positive electrode.

Any separator may be used as long as the separator is generally used in the lithium secondary battery. For example, polyethylene, polypropylene, polyvinylidene fluoride, or multi-layer having at least two thereof may be used as the separator, and a mixed multi-layer separator such as a polyethylene/polypropylene double-layered separator, a polyethylene/polypropylene/polyethylene triple-layered separator, polypropylene/polyethylene/polypropylene triple-layered separator, and the like, may also be used.

As the electrolyte filled in the lithium secondary battery, a non-aqueous electrolyte, a solid electrolyte known in the art, or the like, may be used, and an electrolyte in which lithium salts are dissolved may be used.

A solvent of the non-aqueous electrolyte is not particularly limited, but cyclic carbonates such as ethylene carbonate, propylene carbonate, butylene carbonate, vinylene carbonate, or the like; chain carbonates such as dimethyl carbonate, methylethyl carbonate, diethyl carbonate, or the like; esters such as methyl acetate, ethyl acetate, propyl acetate, methyl propionate, ethyl propionate, γ-butyrolactone, or the like; ethers such as 1,2-dimethoxyethane, 1,2-diethoxyethane, tetrahydrofuran, 1,2-dioxane, 2-methyltetrahydrofuran, or the like; nitriles such as acetonitrile, or the like; or amides such as dimethylformamide, or the like, may be used. One of these solvents may be used alone, or a plurality of solvents may be combined to thereby be used. Particularly, a mixed solvent of the cyclic carbonate and the chain carbonate may be preferably used.

Further, as the electrolyte, a gel phase polymer electrolyte in which a polymer electrolyte such as polyethyleneoxide, polyacrylonitrile, or the like, is impregnated with an electrolyte solution, or an inorganic solid electrolyte such as LiI, $Li_3N$, or the like, may be used.

In this case, the lithium salt may be one kind selected from a group consisting of $LiPF_6$, $LiBF_4$, $LiSbF_6$, $LiAsF_6$, $LiClO_4$, $LiCF_3SO_3$, Li $(CF_3SO_2)_2N$, $LiC_4F_9SO_3$, $LiSbF_6$, $LiAlO_4$, $LiAlCl_4$, LiCl, and LiI.

As described above, according to the present invention, an olivine based positive electrode active material capable of being easily prepared, prepared on a large scale, and having the carbon coating layer uniformly formed therein may be obtained. Further, a 4V olivine based positive electrode active material having a structure in which a transition metal is partially substituted or oxygen is deficient is prepared, such that the positive electrode active material having high capacity, high energy density, and excellent thermal stability may be obtained.

A simple modification or change of the present invention may be easily performed by those skilled in the art, but this modification or change should be considered to be within the scope of the invention.

Hereinafter, Examples will be provided in order to describe the present invention in more detail. However, the present invention is not limited to the following Examples.

EXAMPLE 1

$Li_2CO_3$, $Fe_2O_3$, $MnO_2$, and $(NH_4)_2HPO_4$ were mixed so that a molar ratio of Li:Mn:Fe:P becomes 0.9:0.8:0.2:1, and then 10 g of the mixture was added to 30 g of alcohol (anhydrous ethanol) to prepare a metal mixed solution.

After the metal mixed solution was put in a Spex-mill jar (Spexsamplerprep, 8000M 115 Single Mixer/Mill) and milled at 900 rpm for 100 minutes to atomize the solution, 10 weight % of pitch carbide was added to 90 weight % of the atomized solution as a carbon raw material.

The mixture was heat-treated at 750° C. for 10 hours under an inert atmosphere ($H_2$/Ar=95:5).

An average particle size of the secondary particle prepared as described above was 1 μm. 80 weight % of the secondary particle, 10 weight % of carbon black (Super-P, conductive material), and 10 weight % of polyvinylidene fluoride (binding material) were added to n-methylpyrrolidone (NMP), thereby preparing positive electrode mixture slurry. This slurry was coated on one surface of aluminum foil and then dried. The results were shown in the following Table 1.

EXAMPLE 2

A positive electrode active material was prepared by the same method as in Example 1 except for changing a molar ratio of the raw materials. The molar ratio of Li:Mn:Fe:P was 0.9:0.85:0.15:1.

EXAMPLE 3

A positive electrode active material was prepared by the same method as in Example 1 except for changing a mole ratio of the raw materials. The molar ratio of Li:Mn:Fe:P was 0.9:0.9:0.1:1.

EXAMPLE 4

A positive electrode active material was prepared by the same method as in Example 1 except for changing a mole ratio of the raw materials. The molar ratio of Li:Mn:Fe:P was 1.0:0.8:0.2:1.

EXAMPLE 5

A positive electrode active material was prepared by the same method as in Example 1 except for changing a mole ratio of the raw materials. The molar ratio of Li:Mn:Fe:P was 1.0:0.85:0.15:1.

EXAMPLE 6

A positive electrode active material was prepared by the same method as in Example 1 except for changing a mole ratio of the raw materials. The molar ratio of Li:Mn:Fe:P was 1.0:0.9:0.1:1.

EXAMPLE 7

A positive electrode active material was prepared by the same method as in Example 1 except for changing a mole ratio of the raw materials. The molar ratio of Li:Mn:Fe:P was 1.1:0.8:0.2:1.

EXAMPLE 8

A positive electrode active material was prepared by the same method as in Example 1 except for changing a mole ratio of the raw materials. The molar ratio of Li:Mn:Fe:P was 1.1:0.85:0.15:1.

EXAMPLE 9

A positive electrode active material was prepared by the same method as in Example 1 except for changing a mole ratio of the raw materials. The molar ratio of Li:Mn:Fe:P was 1.1:0.9:0.1:1.

EXAMPLE 10

A positive electrode active material was prepared by the same method as in Example 1 except for changing a mole ratio of the raw materials. The molar ratio of Li:Mn:P was 0.9:1:1.

EXAMPLE 11

A positive electrode active material was prepared by the same method as in Example 1 except for changing a mole ratio of the raw materials. The molar ratio of Li:Mn:P was 1.0:1:1.

EXAMPLE 12

A positive electrode active material was prepared by the same method as in Example 1 except for changing a mole ratio of the raw materials. The molar ratio of Li:Mn:P was 1.1:1:1.

COMPARATIVE EXAMPLE 1

A positive electrode active material was prepared by the same method as in Example 2 except for using 30 weight % of pitch carbide as a carbon raw material.

COMPARATIVE EXAMPLE 2

A positive electrode active material was prepared by the same method as in Example 10 except for using 30 weight % of pitch carbide as a carbon raw material.

Physical properties of the positive electrode active materials manufactured in Examples 1 to 12 and Comparative Examples 1 and 2 were measured and shown in Table 1.

The physical properties were measured by the following measuring methods.

1) Capacity (mAh/g)

A half cell of a 2032 coin type cell was manufactured using a lithium metal as a negative electrode, and the capacity was measured at charging and discharging voltages of 2.7V to 4.4V at 0.1 C.

2) Carbon Coating Thickness

The thickness was measured by transmission electron microscope (TEM, JEOL 2010, Japan).

TABLE 1

| | Carbon raw material content (weight %) | Compound | Capacity (mAh/g) | Carbon coating thickness (nm) |
|---|---|---|---|---|
| Example 1 | 10 | $Li_{0.9}Mn_{0.8}Fe_{0.2}PO_4$ | 160 | 10 |
| Example 2 | 10 | $Li_{0.9}Mn_{0.85}Fe_{0.15}PO_4$ | 165 | 10 |
| Example 3 | 10 | $Li_{0.9}Mn_{0.9}Fe_{0.1}PO_4$ | 163 | 10 |
| Example 4 | 10 | $Li_{1.0}Mn_{0.8}Fe_{0.2}PO_4$ | 155 | 10 |
| Example 5 | 10 | $Li_{1.0}Mn_{0.85}Fe_{0.15}PO_4$ | 160 | 10 |
| Example 6 | 10 | $Li_{1.0}Mn_{0.9}Fe_{0.1}PO_4$ | 158 | 10 |
| Example 7 | 10 | $Li_{1.1}Mn_{0.8}Fe_{0.2}PO_4$ | 153 | 10 |
| Example 8 | 10 | $Li_{1.1}Mn_{0.85}Fe_{0.15}PO_4$ | 157 | 10 |
| Example 9 | 10 | $Li_{1.1}Mn_{0.9}Fe_{0.1}PO_4$ | 156 | 10 |
| Example 10 | 10 | $Li_{0.9}MnPO_4$ | 160 | 10 |
| Example 11 | 10 | $Li_{1.0}MnPO_4$ | 158 | 10 |
| Example 12 | 10 | $Li_{1.1}MnPO_4$ | 155 | 10 |
| Comparative Example 1 | 30 | $Li_{0.9}Mn_{0.85}Fe_{0.15}PO_4$ | 140 | 30 |
| Comparative Example 2 | 30 | $Li_{0.9}MnPO_4$ | 145 | 30 |

As shown in Table 1, it could be appreciated that the positive electrode active materials according to the Examples of the present invention had excellent capacity of 150 mAh/g even at a carbon coating thickness of 10 nm. In addition, as shown in Comparative Examples 1 and 2, it was confirmed that when the carbon coating thickness was excessively thick, the capacity was rather decreased.

The invention claimed is:

1. A positive electrode active material for a lithium secondary battery comprising particles represented by the following Chemical Formula 1 and having an average particle size of 200 nm to 1 μm, wherein surfaces of the particles are coated with a carbon coating layer having a thickness of 5 to 10 nm, $$Li_{0.9}Mn_{1-x}Fe_xPO_4 \qquad \text{[Chemical Formula 1]}$$

where x satisfies the following Equations: 0.1<x<0.2, and wherein the positive electrode active material has a capacity of greater than or equal to 160 mAh/g as measured at charging and discharging voltages of 2.7 V to 4.4 V at 0.1 C.

2. The positive electrode active material for a lithium secondary battery of claim 1, wherein the carbon coating layer is made of amorphous carbon.

3. A lithium secondary battery comprising:
a positive electrode containing the positive electrode active material of claim 1;
a negative electrode containing a negative electrode active material; and
a non-aqueous electrolyte solution.

4. A method for producing a positive electrode active material for a lithium secondary battery, the method comprising:
adding a lithium raw material, a manganese raw material, a phosphorus raw material, and an iron raw material to anhydrous ethanol to prepare a metal mixed solution;
milling the metal mixed solution to atomize the metal mixed solution and form an atomized solution;
adding a carbon raw material to the atomized solution and uniformly mixing the carbon raw material with the atomized solution to form a mixture; and
performing heat-treatment on the mixture under an inert atmosphere to form a positive electrode active material for a lithium secondary battery comprising particles represented by the following Chemical Formula 1 and having an average particle size of 200 nm to 1 μm, wherein surfaces of the particles are coated with a carbon coating layer having a thickness of 5 to 10 nm, $$Li_{0.9}Mn_{1-x}Fe_xPO_4 \qquad \text{[Chemical Formula 1]}$$

where x satisfies the following Equations: 0.1≤x≤0.2.

5. The method of claim 4, wherein at the time of preparing the metal mixed solution, a content of anhydrous ethanol is in a range of 1:1 to 10 by weight ratio based on the total weight of the lithium raw material, the manganese raw material, and the phosphorus raw material, or in a range of 50 to 200 mole % based on the manganese raw material.

6. The method of claim 4, wherein a mixing ratio of the lithium raw material, the manganese raw material, and the phosphorus raw material is adjusted so that a molar ratio of Li:Mn:P 0.9 : 0.85 to 0.9 : 1.

7. The method of claim 4, wherein the content of the iron raw material is 10 mole % or more and smaller than 20 mole % when the total amount of the lithium raw material, the manganese raw material, the phosphorus raw material, and the iron raw material is defined as 100 mole %.

8. The method of claim 4, wherein the carbon raw material is any one or a mixture of two or more selected from soft carbon (low-temperature fired carbon), pitch carbide, mesophase pitch carbide, fired cokes, citric acid, ascorbic acid, polyvinyl alcohol, urea, sucrose, glucose, and cellulose.

9. The method of claim 4, wherein the heat-treatment under the inert atmosphere is performed at 500 to 800° C.

* * * * *